United States Patent [19]
Judice

[11] 3,997,719
[45] Dec. 14, 1976

[54] BI-LEVEL DISPLAY SYSTEMS

[75] Inventor: Charles Norris Judice, Lincroft, N.J.

[73] Assignee: Bell Telephone Laboratories, Incorporated, Murray Hill, N.J.

[22] Filed: Mar. 19, 1975

[21] Appl. No.: 560,505

[52] U.S. Cl. .................... 178/7.3 D; 315/169 TV; 340/324 M

[51] Int. Cl.² .................... H04N 5/70; G08B 23/00

[58] Field of Search ......... 178/7.1, 7.3 D, DIG. 34, 178/DIG. 3; 340/146.3 MA, 324 M, 166 R, 166 EL, 146.3 Q; 315/169 TV, 169 R

[56] References Cited
UNITED STATES PATENTS

| | | | |
|---|---|---|---|
| 3,522,585 | 8/1970 | Lemay | 340/146.3 Q |
| 3,590,156 | 6/1971 | Easton | 315/169 TV |
| 3,647,958 | 3/1972 | Sobel | 178/7.3 D |
| 3,706,071 | 12/1972 | Gray | 340/146.3 Q |
| 3,843,959 | 10/1974 | Owaki et al. | 178/7.3 D |
| 3,845,243 | 10/1974 | Schmersal et al. | 178/7.3 D |
| 3,863,023 | 1/1975 | Schmersal et al. | 178/7.3 D |
| 3,925,609 | 12/1975 | Ninke | 178/7.3 D |

Primary Examiner—John C. Martin
Attorney, Agent, or Firm—Ronald D. Slusky

[57] ABSTRACT

Bi-level display systems capable of presenting gray-scale images are adapted for brightness and contrast control by circuitry which varies the means and deviation of the threshold values assigned to the cells of the display panel.

26 Claims, 7 Drawing Figures

| 240 | 112 | 208 | 80 | 240 | 112 | 208 | 80 | 240 | 112 | 208 | 80 |
|---|---|---|---|---|---|---|---|---|---|---|---|
| 160 | 0 | 128 | 32 | 160 | 0 | 128 | 32 | 160 | 0 | 128 | 32 | 160 |
| 96 | 192 | 64 | 224 | 96 | 192 | 64 | 224 | 96 | 192 | 64 | 224 | 96 |
| 144 | 48 | 176 | 16 | 144 | 48 | 176 | 16 | 144 | 48 | 176 | 16 | 144 |
| 80 | 240 | 112 | 208 | 80 | 240 | 112 | 208 | 80 | 240 | 112 | 208 | 80 |
| 160 | 0 | 128 | 32 | 160 | 0 | 128 | 32 | 160 | 0 | 128 | 32 | 160 |
| 96 | 192 | 64 | 224 | 96 | 192 | 64 | 224 | 96 | 192 | 64 | 224 | 96 |
| 144 | 48 | 176 | 16 | 144 | 48 | 176 | 16 | 144 | 48 | 176 | 16 | 144 |
| 80 | 240 | 112 | 208 | 80 | 240 | 112 | 208 | 80 | 240 | 112 | 208 | 80 |
| 160 | 0 | 128 | 32 | 160 | 0 | 128 | 32 | 160 | 0 | 128 | 32 | 160 |
| 96 | 192 | 64 | 224 | 96 | 192 | 64 | 224 | 96 | 192 | 64 | 224 | 96 |
| 144 | 48 | 176 | 16 | 144 | 48 | 176 | 16 | 144 | 48 | 176 | 16 | 144 |
| 80 | 240 | 112 | 208 | 80 | 240 | 112 | 208 | 80 | 240 | 112 | 208 | 80 |

FIG. 3

| 70 | 164 | | | | | | | 135 | 133 | 101 | |
|---|---|---|---|---|---|---|---|---|---|---|---|
| 61 | 152 | 150 | 130 | 130 | 142 | 143 | 142 | 131 | 149 | 119 | 149 | 149 |
| 71 | 140 | 171 | 128 | 156 | 140 | 128 | 123 | 161 | 124 | 137 | 142 | 156 |
| 143 | 147 | 150 | 156 | 143 | 137 | 143 | 133 | 131 | 128 | 128 | 133 | 142 |
| 156 | 128 | 145 | 131 | 140 | 135 | 138 | 143 | 140 | 150 | 137 | 143 | 135 |
| 152 | 138 | 154 | 154 | 133 | 156 | 145 | 126 | 128 | 128 | 123 | 133 | 117 |
| 119 | 150 | 140 | 142 | 145 | 131 | 130 | 133 | 109 | 133 | 126 | 128 | 128 |
| 124 | 157 | 154 | 152 | 143 | 137 | 142 | 149 | 130 | 135 | 135 | 126 | 130 |
| 128 | 130 | 149 | 145 | 138 | 150 | 145 | 163 | 135 | 133 | 131 | 131 | 109 |
| 131 | 130 | 163 | 123 | 119 | 147 | 130 | 128 | 133 | 128 | 128 | 126 | 107 |
| 140 | 130 | 130 | 154 | 131 | 131 | 145 | 123 | 133 | 128 | 117 | 131 | 116 |
| 145 | 128 | 156 | 133 | 131 | 124 | 128 | 137 | 140 | 130 | 133 | 135 | 117 |
| 143 | 140 | 128 | 138 | 130 | 128 | 147 | 131 | 119 | 124 | 124 | 126 | 128 |

BI-LEVEL DISPLAY SYSTEMS

BACKGROUND OF THE INVENTION

The present invention relates to bi-level display systems and, in particular, to a method and arrangement for controlling the brightness and contrast of gray-scale, or continuous-tone, images presented by such systems.

At the heart of a bi-level display system in a display panel typically comprising a matrix of individual, closely spaced display cells each of which resides in one of two visual states. That is, each display cell is either completely energized (on) or completely de-energized (off). A plasma panel, for example, is one known type of bi-level display panel. Picture images and other graphic data are readily displayed on a bi-level display panel via selective energization of its cells.

A gray-scale, or continuous-tone, image is characterized by regions of reflected or emitted light of various intensities. To reproduce the image on a display medium, the intensities of these various regions are mapped into, i.e., represented by, correspondingly intense, or bright, regions of the display medium. The greater the intensity of a region of the image, the brighter the spatially corresponding region of the display panel. Unfortunately, an individual cell of a bi-level display panel can represent only one of two extreme intensities, corresponding to the on and off states of the cell. Thus unlike a cathode-ray tube, for example, a bi-level display panel cannot reproduce gray-scale information at each individual display cell location. However, it is known that the above-described mapping can be substantially achieved by representing the average intensity of a region of the image by a region of the display panel having a corresponding average brightness.

One such average-intensity mapping method scans the image to be reproduced in a matrix of picture elements, each corresponding to a different cell of the panel. The intensity of each picture element is quantized into one of a plurality of intensity levels between predetermined upper and lower quantization limits, or levels. Each cell of the display panel is assigned a respective threshold value in accordance with a selected one of several known criteria, as discussed more fully hereinbelow. The intensity of each picture element is compared to the threshold value assigned to the corresponding display cell. If the intensity is greater than the assigned threshold value, the cell is energized. Otherwise it is maintained de-energized.

As indicated above, any of several known criteria, or techniques, can be employed to generate the threshold values to be assigned to the cells of the display panel. One particularly advantageous technique is known as the "ordered dither," or more simply "dither," technique. In a so-called "dithered display system," the cells of the display panel are divided into a plurality of submatrices of predetermined size such as sixteen cells in a four cell-by-four cell arrangement. Each cell within each submatrix is assigned a spatially corresponding threshold value from a predetermined "dither matrix" having (in this example) sixteen threshold values. The dither threshold values are conveniently distributed between the above-mentioned quantization limits with substantially equal spacing between numerically successive threshold values.

A number of other known techniques derive the threshold value to be assigned to each display cell from the characteristics of the scanned image. These techniques are more complex than the dither technique, described above, but may provide improved reproduction of certain types of images, e.g., printed text.

The present invention is directed to a method and arrangement for controlling the brightness and contrast of continuous-tone images which are presented on bi-level display panels via the above-described thresholding. The brightness of an image is determined by the total amount of light emitted or reflected therefrom. The contrast of an image, on the other hand, is determined by the relative difference in brightness between light and dark areas of the image. In a highly contrasted image, for example, the lighter areas are very bright, the darker areas are very dark and little of the image is represented by intermediate, or gray, tones. In a poorly contrasted image, little of the image is very light or very dark and thus there is relatively little difference in brightness between the lightest and darkest areas. The amounts of brightness and contrast which are most pleasing for any particular displayed image are subjective with the individual viewer. Thus it is desirable in many display applications to provide the viewer with a way of adjusting these image characteristics to suit himself.

One obvious approach to controlling the brightness and contrast of a displayed continuous-tone image is to alter the brightness and contrast of the image to be displayed before it is scanned by the display system. This may be accomplished, for example, by varying the intensity and/or frequency content of the light which is directed onto the image. This is usually not practical, however. The required apparatus is bulky, relatively expensive and not easily controlled by the viewer. Moreover, this approach does not permit persons viewing the image on different display panels to individually adjust the displayed image to suit themselves.

Another approach to controlling the brightness and contrast of a displayed continuous-tone image is to appropriately preprocess the scanned image signal in response, for example, to viewer operation of separate brightness and contrast control knobs. The preprocessed signal is then processed and displayed as a continuous-tone image in the manner described above. A principal disadvantage of this preprocessing approach is that it may be difficult, expensive or inconvenient to modify an existing display system to accept the appropriate image signal preprocessing circuitry.

SUMMARY OF THE INVENTION

Accordingly, a general object of the present inventin is to provide improved bi-level display systems.

A more specific object of the invention is to provide a simple and economical method and arrangement for controlling the brightness and contrast of continuous-tone images generated via the above-described thresholding techniques.

In accordance with the invention, these and other objects are achieved in a bi-level display system by providing circuitry for varying the assigned thresholds from the values which are assigned thereto via conventional criteria. In particular, I have found that modifying the mean, or average, of conventionally generated threshold values effects a change in the overall brightness of the displayed image as compared to the brightness of the same image displayed using the conventional, unmodified threshold values. I have additionally found that modifying the deviation of, i.e., the average separation between, numerically successive ones of the conventionally generated threshold values effects a change in the contrast of the displayed image.

The present invention is particularly effective when implemented in a dithered display system. The brightness and contrast of continuous-tone images presented by a dithered display system are controlled in accordance with the invention by providing circuitry for modifying the means and deviation, respectively, of the dither matrix threshold values.

BRIEF DESCRIPTION OF THE DRAWING

The invention may be clearly understood from a consideration of the following detailed description and accompanying drawing in which.

DETAILED DESCRIPTION

Figure 1:
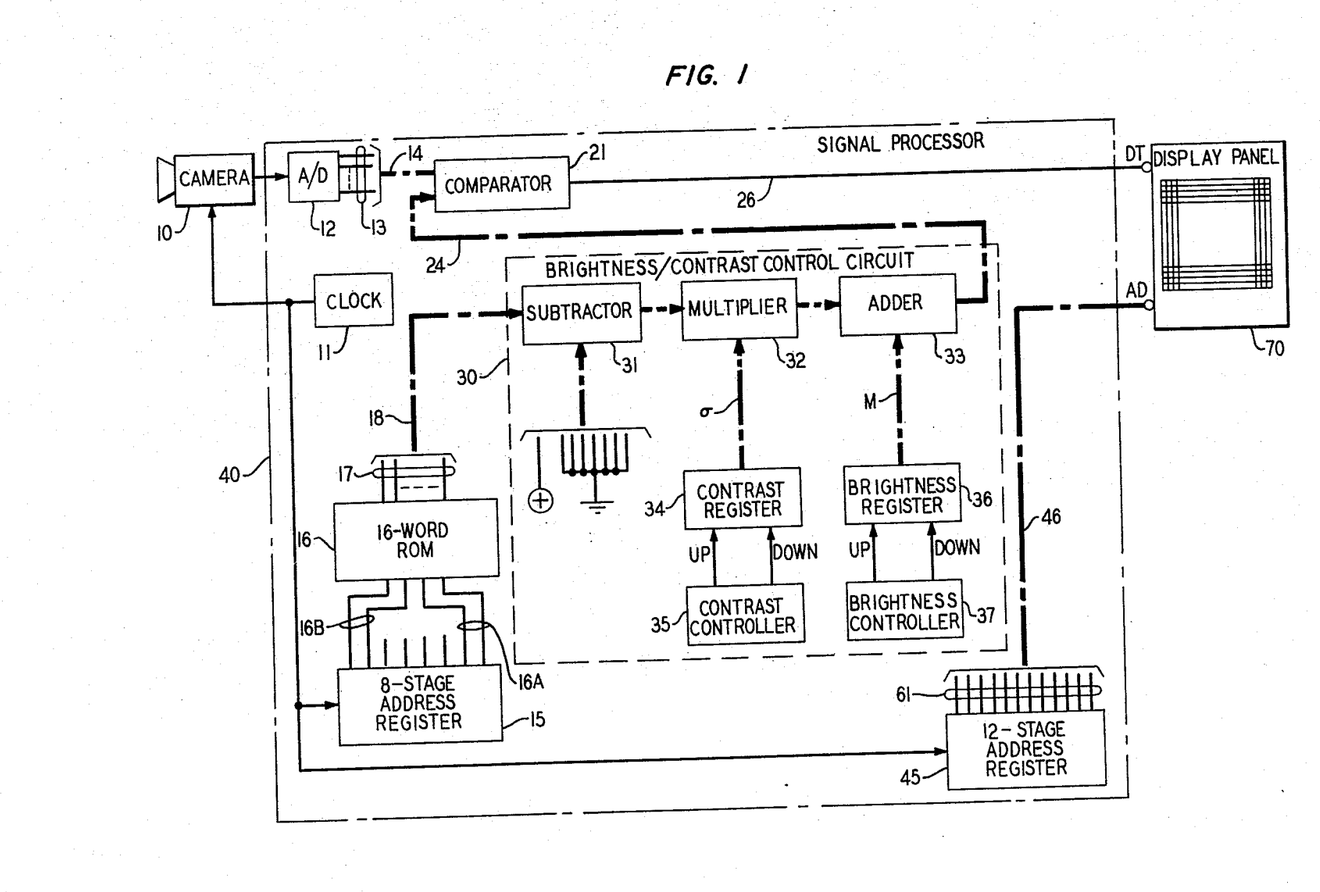
FIG. 1 is a block diagram of an illustrative bi-level display system utilizing the dither technique for presenting gray-scale, or continuous-tone, images. The display system of FIG. 1 includes circuiry in accordance with the invention for controlling the brightness and contrast of the displayed images.

The bi-level display system of FIG. 1 includes a camera 10, a signal precessor 40 and a bi-level display panel 70. Panel 70 is illustratively a plasma display panel such as that disclosed in D. T. Ngo U.S. Pat. No. 3,671,938 issued June 20, 1972. Advantageously, however, the present invention can be implemented in a system including virtually any type of bi-level display panel, including, for example, a cathode-ray tube operated in a bi-level mode. Panel 70 comprises 4096 display cells arranged in a square matrix of 64 rows and 64 columns. Of course, it will be appreciated that the number of cells is, again, merely illustrative. Each of the cells of bi-level display panel 70 resides in one of two visual states—either fully energized, or on, or fully de-energized, or off. In various alternative embodiments, the cells of the display panel may be individual discrete devices or, alternatively, may be respective areas of a continuous display medium such as the phosphor surface of a cathode-ray tube.

Figure 2:
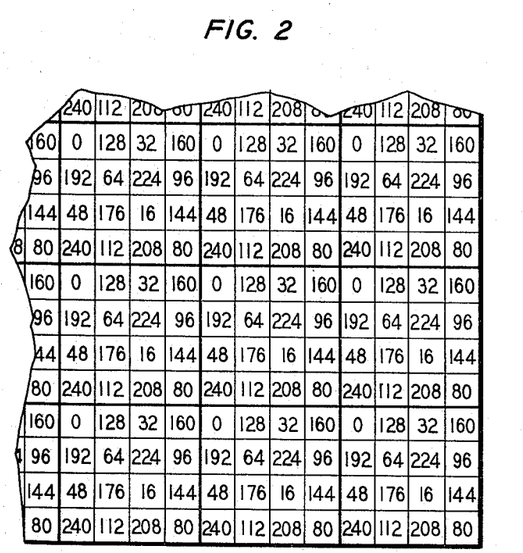
FIG. 2 is an enlarged view of a portion of the display panel utilized in the display system of FIG. 1 and shows conventional dither threshold values assigned to the cells of the panel.

A small portion of the lower right-hand corner of panel 70 is shown in enlarged view in FIG. 2. The cells of panel 70 have been assigned respective threshold values in accordance with a predetermined criterion—in this case, via the above-described dither technique. Thus as indicated in FIG. 2, the cells of panel 70 may be conceptualized as being divided into a plurality of submatrices each comprising 16 cells and each cell of each submatrix has assigned thereto a different threshold value from the predetermined dither matrix $$\begin{bmatrix} 0 & 128 & 32 & 160 \\ 192 & 64 & 224 & 96 \\ 48 & 176 & 16 & 144 \\ 240 & 112 & 208 & 80 \end{bmatrix}.$$

As described in further detail hereinafter, this conventional dither matrix is characterized by a plurality of threshold values distributed substantially uniformly between predetermined upper and lower limits with numerically successive threshold values spatially separated from one another within the matrix.

An image to be presented on panel 70 is scanned in a format which divides the image into a matrix of 4096 picture elements arranged in 64 rows and 64 columns. Each scanned picture element thus corresponds to a single one of the cells of panel 70. The intensity of each picture element in the illustrative embodiment is quantized into one of 256 intensity levels, or values, between 0 and 255. The quantized intensity value of each picture element is compared to the dither threshold value assigned to the corresponding display cell. If the intensity value of any given picture element is greater than the dither threshold value assigned to the corresponding display cell, that cell is turned on. Conversely, if the intensity value of any given picture element is less than or equal to the dither threshold value assigned to the corresponding display cell, that cell is maintained off.

Figure 3:
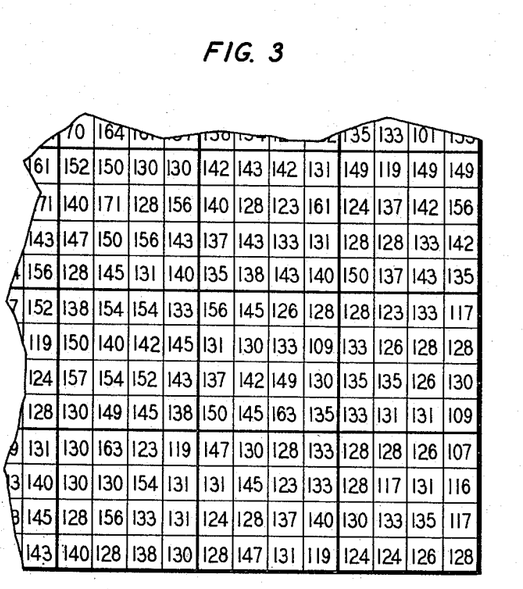
FIG. 3 is a map of quantized picture element intensity values for a small portion of an illustrative scanned image to be presented by the display system of FIG. 1.
Figure 4:
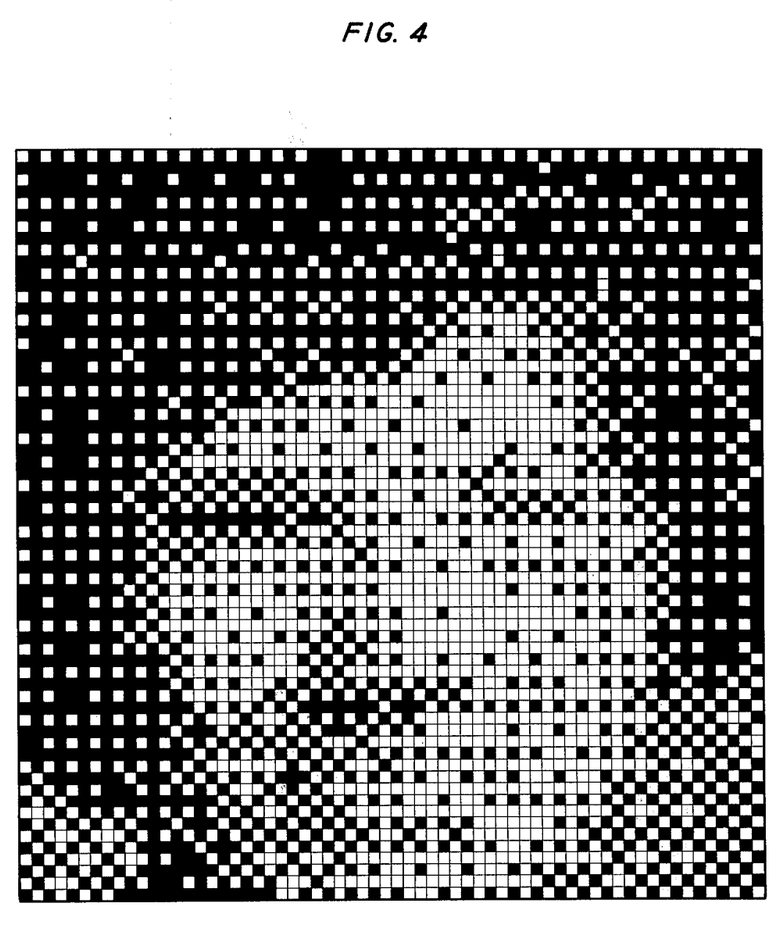
FIG. 4 is an enlarged view of the display panel utilized in the display system of FIG. 1, the panel having selected ones of its cells energized to present a dithered version of the scanned image.

FIG. 3 shows a map of picture element intensity values for a small portion of an illustrative scanned image to be presented on panel 70. These picture elements correspond to respective ones of the lower right-hand corner cells of panel 70 shown in FIG. 2. FIG. 4 depicts an enlarged view of panel 70 with selected ones of its cells energized to present a dithered image. The light areas in FIG. 4 correspond to display cells which are on. The dark areas correspond to display cells which are off. The pattern of on and off cells in the lower right-hand corner of FIG. 4 is derived by comparing the picture element intensity values in the map of FIG. 3 with the dither threshold values assigned to the corresponding cells of panel 70 shown in FIG. 2. When the viewer observes the FIG. 4 representation of panel 70 from a distance, it will be seen that, as a result of the above-described dither processing, various shades of gray appear in the reproduced image. More particularly, the intensities of the various regions of the illustrative scanned image have been substantially mapped into, i.e., represented by, correspondingly intense, or bright, regions of panel 70; the greater the intensity in a region of the image, the brighter the spatially corresponding region of the panel.

The circuitry in FIG. 1 which provides for the presentation of dithered images on panel 70 in the manner described above includes camera 10 and circuitry in signal processor 40 including clock 11, analog-to-digital converter 12, address register 15, 16-word read-only memory (ROM) 16, comparator 21 and address register 45.

An image to be displayed is scanned by camera 10 in a format which divides the image into a matrix of 4096 picture elements arranged in 64 rows and 64 columns. Scanning begins with the top row and proceeds from left to right in each row. Camera 10 generates an analog signal representing the intensity of the picture element currently being scanned. Each of successive, regularly spaced pulses from clock 11 causes the signal representing the intensity of a successive scanned picture element to be extended from camera 10 to digital-to-analog converter 12. The latter quantizes each intensity signal extended thereto into one of 256 levels between 0 and 255. A multi-bit binary signal indicative of that level is extended to comparator 21 via binary leads 13 and cable 14.

The pulses from clock 11 are also extended to address register 15. The latter comprises an 8-stage binary counter which advances one count for each pulse from clock 11. The two lowest-order address leads 16A of ROM 16 are coupled to the outputs of the two least significant stages of register 15. The two highest-order address lads 16B of ROM 16 are coupled to the two most significant stages of register 15. The 16 dither threshold values assigned to the cells in each submatrix of panel 70 as shown in FIG. 2 are stored in ROM 16 in the order 0, 128, 32, 160, 192, 64, 224, 96, 48, 176, 16, 144, 240, 112, 208, 80.

Thus it will be appreciated that the output of ROM 16 in response to each group of 256 successive pulses from clock 11 comprises the sequence 0, 128, 32, 160 repeated 16 times, then the sequence 192, 64, 224, 96 repeated 16 times, then the sequence 48, 176, 16, 144 repeated 16 times and then the sequence 240, 112, 208, 80 repeated 16 times. This sequence of threshold values is provided in binary form on output leads 17 of ROM 16 and is extended via cable 18 to brightness/-contrast control circuit 30. It may be assumed at this point that control cicuit 30 does not change the threshold values extended thereto but merely passes them through to its output cable 24 and thence to comparator 21. Thus the quantized intensity value of each picture element is extended to comparator 21 concurrently with the dither threshold value assigned to the display cell which corresponds to that picture element.

The output of comparator 21 is a one-bit binary signal which is extended to data input terminal DT of panel 70 via lead 26. The value of the signal on lead 26 is 1 if the intensity value represented on cable 14 is greater than the dither threshold value represented on cable 24. This 1 indicates to panel 70 that the cell corresponding to the picture element currently being scanned should be on. Circuitry internal to panel 70 accesses that cell to extend a "write", or "energize", signal thereto. If, on the other hand, the intensity value represented on cable 14 is less than or equal to the dither threshold value represented on cable 24, a 0 is provided on lead 26 indicating that cell should be off. In that case, the cell is accessed with an "erase", or "de-energize" signal.

A multi-bit binary signal indicating the location of the cell corresponding to the picture element currently being scanned is extended to address input AD of panel 70 from address register 45 via binary leads 61 and cable 46. Register 45 is illustratively a 12-stage binary counter which advances one count for each pulse from clock 11. The six most significant and the six least significant bits on leads 61 respectively indicate the row and column of panel 70 in which the cell in question is located.

In accordance with the present invention, the brightness and contrast of cntinuous-tone images presented by bi-level display systems such as the illustrative system of FIG. 1 are controlled by controlling or varying the thresholds assigned to the display cells from the values assigned thereto via conventional criteria. In particular, I have discovered that modifying the mean, or average, of conventionally generated threshold values effects a change in the overall brightness of the displayed imae as compared to the same image displayed using the conventional, unmodified threshold values. I have additionally discovered that varying the deviation of, i.e., the average separation between, numerically successive ones of the conventionally assigned threshold values effects a change in the contrast of the displayed image.

The present invention is particularly effective when implemented in a dithered display system. The illustrative bi-level display system of FIG. 1 has thus been shown utilizing the dither technique to generate the threshold values assigned to each display cell. It will be appreciated, however, that the invention may be implemented in continuous-tone bi-level display systems using techniques other than dither to generate the threshold values.

Before it is shown how dither threshold values may be modified in accordance with the invention to provide brightness and contrast control in a dithered display system, consideration of the following general discussion of dither matrix construction may be found helpful. Firstly, it should be appreciated that although the dither matrix utilized in the display system of FIG. 1 has 16 elements, this number is merely illustrative. Advantageously, increasing the number of threshold values (and correspondingly, of course, the number of cells in each submatrix of the display panel) increases the number of shades of gray which are represented in the reproduced image. As the size of the dither matrix is increased, however, distinctions between the numerous shades of gray which are represented may become too subtle for the viewer to perceive. Factors to be taken into account in choosing the dither matrix size include the distance from which observers are expected to view the display panel, the overall dimensions of the panel and the nature of the images to be presented on the panel.

Once an appropriate dither matrix size has been chosen for the display application at hand, the threshold values themselves are selected. It is conventional to select the threshold values of a dither matrix such that they are distributed across substantially the entire quantization range utilized in the display system, with numerically successive threshold values having a constant difference between them. With such distribution, the mean of the threshold values is at or near the midpoint of the quantization range and the above-mentioned constant difference is substantially equal to the quotient of the width of the quantization range and the size of the dither matrix. Thus in the above dither matrix, the 16 threshold values are spread across substantially the entire quantization range 0–255. Their mean is 120, which is near the quantization range midpoint of 128 and each threshold value differs from the next-larger threshold value by substantially $(255-0)/16 \approx 16$.

The selected threshold values are then arranged within the dither matrix. It has been found that optimum gray-scale and picture resolution characteristics are achieved when numerically successive threshold values are spatially separated from one another within the matrix. In the above dither matrix, for example, the 0 is relatively distant from the 16, which is relatively distant from the 32 and so forth.

More generally, the above-described spatial separation criterion can be satisfied for an $n$-by-$n$ dither matrix, for example, $n$ being an integer power of 2, by arranging the $n^2$ threshold values of the dither matrix in the order defined by the dither operator $\hat{D}_n$. The latter is derived by combining the four operator matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement such as $$\hat{D}_n = \begin{bmatrix} [4\hat{D}_{n/2}] & [4\hat{D}_{n/2} + 2\hat{U}_{n/2}] \\ [4\hat{D}_{n/2} + 3\hat{U}_{n/2}] & [4\hat{D}_{n/2} + \hat{U}_{n/2}] \end{bmatrix}$$

This is a recursive definition in which $\hat{D}_2$ is a two-by-two matrix comprising the numbers 0, 1, 2 and 3 such as the matrix $$\begin{bmatrix} 0 & 2 \\ 3 & 1 \end{bmatrix}$$

and $\hat{U}_2$ is a two-by-two matrix each element of which is 1. It is preferable, although not necessary, that the operator matrices $[4\hat{D}_{n/2}]$ and $[4\hat{D}_{n/2} + \hat{U}_{n/2}]$ be on the same one diagonal of dither operator $\hat{D}_n$, such as in the above arrangement, and the numbers 0 and 1 be on the same one diagonal of operator matrix $\hat{D}_2$.

Using the above definition, one of several possible $\hat{D}_4$ dither operators, for example, is $$\hat{D}_4 = \begin{bmatrix} 0 & 8 & 2 & 10 \\ 12 & 4 & 14 & 6 \\ 3 & 11 & 1 & 9 \\ 15 & 7 & 13 & 5 \end{bmatrix}.$$

The dither matrix, $$\begin{bmatrix} 0 & 128 & 32 & 160 \\ 192 & 64 & 224 & 96 \\ 48 & 176 & 16 & 144 \\ 240 & 112 & 208 & 80 \end{bmatrix},$$

is thus seen to have been derived by taking the threshold values 0, 16, 32, 48, etc., which were previously selected, and placing them in the 0, 1, 2, 3, etc., positions, respectively, of the $\hat{D}_4$ dither operator.

Figure 5:
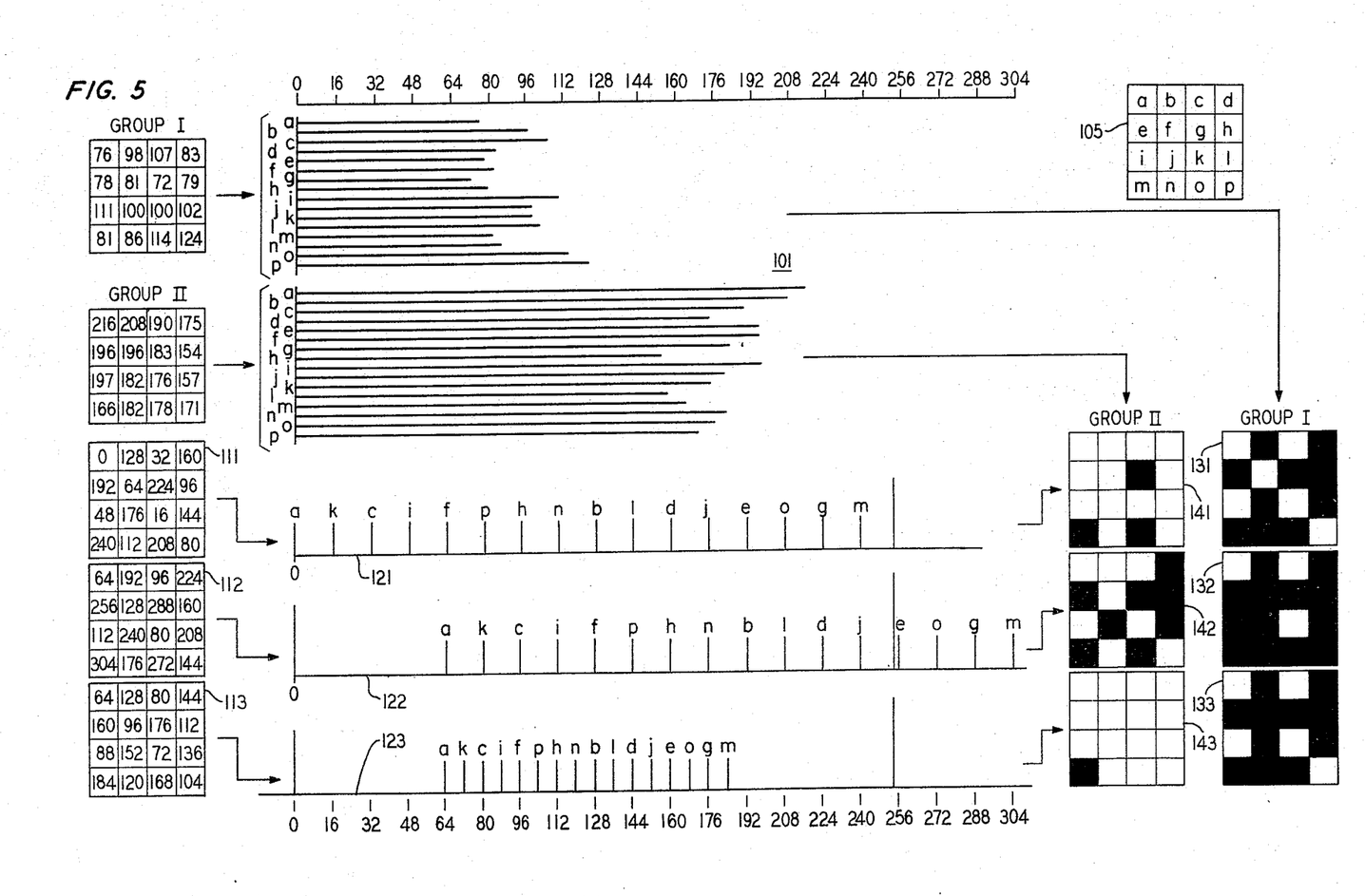
FIG. 5 shows several charts and graphs helpful in understanding the invention.

Reference is now made to FIG. 5, which shows two illustrative four-by-four groups I and II of picture element intensities. Groups I and II are illustratively picture element groups taken from the image which was scanned to generate the dithered image of FIG. 4. Intensity graph 101 in FIG. 5 indicates that the picture elements of group I are taken from a relatively dark area of the scanned image since the intensities thereof are grouped toward the low end of the quantization range 0–255. The picture elements of group II, on the other hand, are taken from a relatively light area of the image. The individual picture element intensities of groups I and II are each identified in graph 101 by a lower-case reference letter indicating the position of each picture element within its own group. A key to the reference letter assignment scheme is indicated at 105.

Three illustrative 16-element dither matrices 111, 112, and 113 are also included in FIG. 5. Their threshold values are shown on intensity graphs 121, 122 and 123, respectively. Each threshold value has a reference letter from key 105 indicating its position within its own matrix. The intensity scales of graphs 121, 122 and 123 are in alignment with the intensity scale of graph 101.

To determine the proper patterns of on and off cells for either picture element group I or II using any selected one of the dither matrices 111, 112 and 113, each picture element intensity is compared to the correspondingly lettered threshold value in the selected matrix in the manner previously described. The patterns of on and off cells for picture element group I using (alternatively) matrix 111, matrix 112 or matrix 113 are indicated at 131, 132 and 133, respectively. The patterns of on and off cells for picture element group II using these matrices are indicated at 141, 142 and 143, respectively.

Particular attention is now directed to dither matrices 111, 112 and 113 themselves. Matrix 111 will be recognized as the conventional dither matrix utilized hereinabove in describing the display system of FIG. 1. As is evident from graph 121, the threshold values of dither matrix 111 are spread across substantially the entire quantization range 0–255. The mean of the matrix 111 threshold values is 120. Their deviation is 16.

The threshold values of dither matrix 112 also have a deviation or 16. However, in accordance with the present invention, their mean has been increased to 184. Illustratively, the same dither operator $\hat{D}_4$ has been used to arrange the threshold values within both matrices 111 and 12. Thus, each threshold value of matrix 112 is larger than the spatially corresponding (i.e., similarly lettered) threshold value in dither matrix 111. On average, then, fewer picture element intensities throughout the scanned image exceed the threshold value assigned to the corresponding display cell when matrix 112 is used, and thus fewer cells are on. This is illustrated by the decreased number of on cells in patterns 132 and 142 as compared to patterns 131 and 141, respectively.

Figure 6:
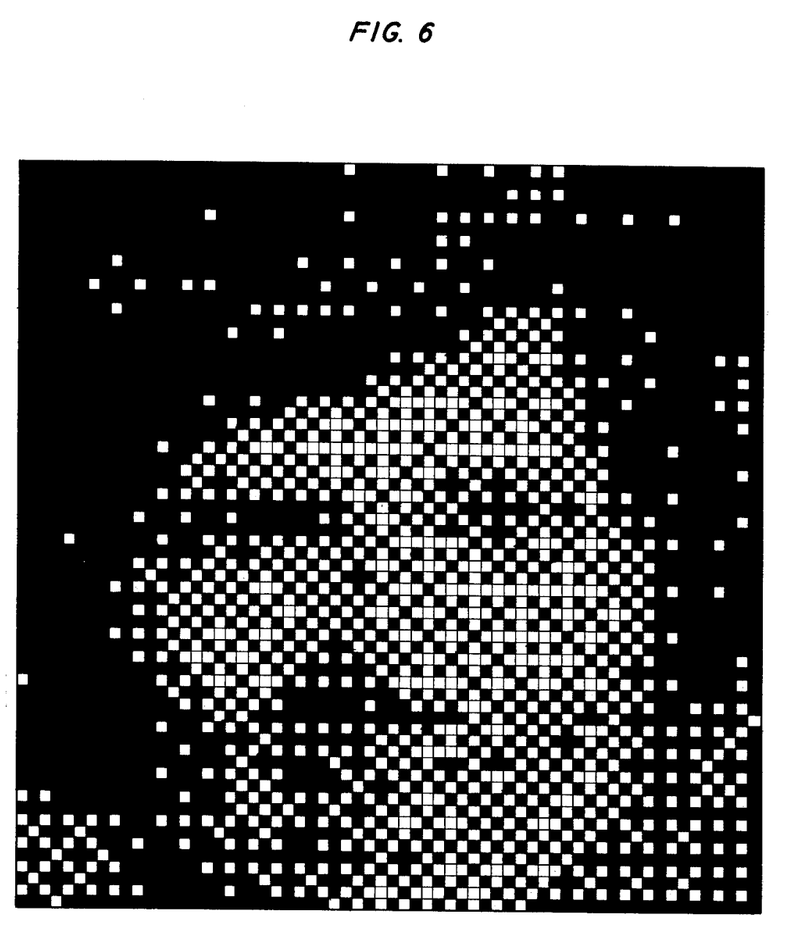
FIG. 6 is another view of the display panel, the dithered image being presented thereon having decreased brightness in accordance with the invention.
Figure 7:
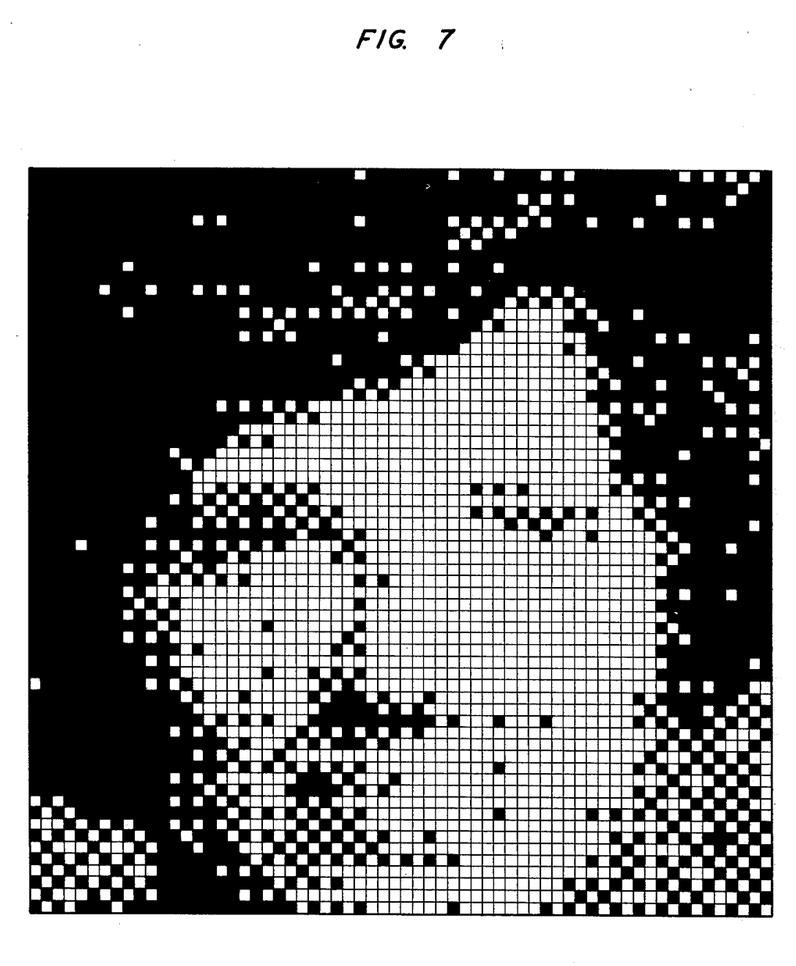
FIG. 7 is a further view of the display panel, the dithered image being presented thereon having increased contrast in accordance with the invention.

Thus it will be appreciated that increasing the mean of the threshold values of a dither matrix effects a darkening of the displayed dithered image. Compare, for example, the dithered image of FIG. 6, which was generated using matrix 112 to the dithered image of FIG. 4 which was generated using matrix 111. Analogously, decreasing the mean of the threshold values of a dither matrix effects, in accordance with the invention, a brightening of the displayed dithered image.

Reference is now made to dither matrix 113. Similar to dither matrix 111, the mean of the matrix 113 threshold values is 120. Thus, the overall brightness of a displayed dithered image is substantially the same using either of these matrices. However, in accordance with the invention, the deviation of the matrix 113 threshold values has been decreased; the average threshold value separation for matrix 113 is 8 as compared to an average separation of 16 for matrix 111, for example.

More particularly, threshold values $a$, $k$, $c$, $i$, $f$, $p$, $h$ and $n$ in matrix 113 are each larger than the corresponding threshold value in matrix 111. Thus, on average, fewer picture element intensities in relatively dark areas of the scanned image exceed the threshold value assigned to the corresponding display cell when matrix 113 is used. The corresponding portions of the display panel have fewer on cells and thus are darker. Compare pattern 133 to pattern 131.

On the other hand, threshold values $l$, $d$, $j$, $e$, $o$, $g$ and $m$ in matrix 113 (threshold $b$ illustratively remaining at 128) are each smaller than the spatially corresponding threshold value in matrix 111. Thus, on average, more piture element intensities in relatively light areas of the scanned image exceed the threshold value assigned to the corresponding display cell than when matrix 111 is used. The corresponding portions of the display panel have more on cells and thus are lighter. Compare pattern 143 to pattern 141.

The combination of dark areas of the image being darkened and light areas of the image being lightened when presented on the panel, as just described, provides an increase in the contrast of the reproduced image. Conversely, a decrease in contrast of the reproduced image is effected by lightening dark area of the image and concurrently darkening light areas of the image when displayed on the panel. This may be accomplished in accordance with the invention by using a dither matrix having increased threshold value deviation.

Control of the brightness of a displayed dithered image and control of its contrast have been described separately herein to facilitate description of the invention. These two characteristics are, however, somewhat interrelated. Refer to dither matrix 112, for example. Although threshold values $e$, $o$, $g$ and $m$ have the values 256, 272, 288 and 304, respectively, these numbers have little meaning. Since the maximum picture element intensity is 255, threshold values $e$, $o$, $g$ and $m$ could just as effectively each have the value 255. The four corresponding display cells in each 16-cell submatrix of the display panel would still be always off. Thus the effective average separation between numerically successive threshold values of matrix 112 is actually something less than 16. Thus, dither matrix 112 provides not only a darker dithered image than, for example, dither matrix 111, but an image with somewhat increased contrast as well.

Thus it is seen that varying the threshold values of a dither matrix to change one characteristic of the displayed image may cause an incidental change in another. Advantageously, however, controlled changes in both brightness and contrast of a displayed dithered image can be effected independently in accordance with the invention. Consider, for example, subtracting a selected numerical amount from each threshold value of dither matrix 113. This, of course, decreases the mean of the matrix 113 threshold values by the selected amount. The average brightness of the displayed image is thereby increased. However, since the deviation of, i.e., the average spacing between, numerically successive dither threshold values of the dither matrix remains at 8, the increased contrast initially provided by matrix 113 is retained.

Brightness/contrast control circuit 30 in the display system of FIG. 1 comprises one of numerous possible arrangements for adapting a dithered display system for brightness and contrast control in accordance with the principles of the invention as described hereinabove. Circuit 30 operates in response to the threshold values serially extended thereto from ROM 16 (i.e., the threshold values from dither matrix 111) in accordance with the expression $$D_{out} = \sigma(D_{in} - 128) + M.$$

Here, $D_{in}$ represents a dither threshold value extended to circuit 30 from ROM 16. $D_{out}$ represents the dither threshold value extended from circuit 30 to comparator 21 in response to $D_{in}$. The quantities $\sigma$ and $M$ are real positive numbers. The value of $\sigma$ controls the deviation of numerically successive $D_{out}$'s and thus the contrast of the reproduced image. The value of $M$ controls the mean of the $D_{out}$'s and thus the brightness of the reproduced image. For example, letting $\sigma = 1.0$ and $M = 128$ regenerates matrix 111. Decreasing $\sigma$ increases the contrast of the reproduced image and vice-versa. Decreasing $M$ increases the brightness of the reproduced image and vice-versa. For example, dither matrix 112 is generated by letting $\sigma = 1.0$ and $M = 192$. Dither matrix 113 is generated by letting $\sigma = 0.5$ and $M = 128$.

Control circuit 30 includes subtractor 31, multiplier 32, adder 33, contrast register 34, contrast controller 35, brightness register 36 and brightness controller 37. Subtractor 31 receives each incoming dither threshold $D_{in}$ on cable 18 and subtracts 128 therefrom to generate the quantity $(D_{in} - 128)$. Multiplier 32 multiplies this quantity by the value of $\sigma$, which is stored in register 34. Finally, adder 33 adds the value of M, which is stored in register 36.

When the display system of FIG. 1 is activated, the values of $\sigma$ and M stored in registers 34 and 36 are automatically initialized to 1.0 and 128, respectively. Either or both of these values may be changed by the viewer to alter the brightness and/or contrast of the reproduced image to suit himself. This is illustratively accomplished via operation of contrast and brightness controllers 35 and 37, respectively. Controllers 35 an 37 may each comprise center-biased rocker switches, for example, and associated circuitry of known type for increasing and decreasing the numbers stored in registers 34 and 36, respectively.

Although illustrative circuitry has been shown and described herein to explain the principles of the invention, the invention is, of course, not limited thereto. For example, although birghtness/contrast control circuit 30 generates equispaced threshold values (such as those of dither matrices 111, 112 and 113), this is not a requirement of the invention. Rather, the spacing between numerically successive threshold values can be based on exponential, geometric or other functions as may be found suitable for a particular application. As before, however, the brightness and contrast of the displayed dithered image will depend on the mean and deviation, respectivly, of the selected threshold values.

Additionally, the brightness and contrast control technique of the present invention can be utilized in a wide variety of display systems including, for example, the animated dithered display system disclosed in my copending patent application, Ser. No. 542,863 filed Jan. 21, 1975.

Thus it will be appreciated that many and varied arrangements in accordance with the principles of the invention may be devised by those skilled in the art without departing from the spirit and scope thereof.

What is claimed is:

1. In a system for displaying a continuous-tone image, said system including a panel of selectively energizable bi-level display cells, means for assigning a respective threshold to each of said cells, and means for selecting ones of said cells for energization in response to comparisons between the intensities of elements of said image and respective ones of said thresholds, said assigning means includng means for assigning said thresholds such that the energization of said ones of said cells substantially maps the intensities of regions of said continuous-tone image into correspondingly bright regions of said panel, a method for varying the characteristics of the displayed continuous-tone image comprising the step of processing selected ones of said thresholds to change the values thereof in such a way that all processed thresholds which have equal values prior to being processed have equal values after being processed.

2. The invention of claim 1 wherein said processing step comprises the step of changing the mean of the values of said thresholds.

3. The invention of claim 1 wherein said processing step comprises the step of changing the deviation of the values of said thresholds.

4. The invention of claim 1 wherein the value of the threshold assigned to each cell is determined by the spatial position of that cell in said panel.

5. In a method for representing a continuous-tone image on a panel of selectively energizable display cells, said image comprising a matrix of picture elements each having a predetermined intensity and each corresponding to a respective one of said display cells, said method comprising the steps of, assigning to said display cells respective thresholds, and energizing a cell of said panel if the intensity of the corresponding picture element bears a predetermined relationship to the value of the threshold assigned to that cell, the values of said thresholds being such that said energizing substantially maps the intensities of regions of said continuous-tone image into correspondingly bright regions of said panel, said method characterized by the step of processing at least selected ones of said thresholds to modify the values thereof in such a way that all processed thresholds which have equal values prior to being processed have equal values after being processed.

6. The invention of claim 5 wherein said cells are arranged in a plurality of cell submatrices and wherein in said assigning step each cell of each of said submatrices is assigned a spatially corresponding threshold value from a predetermined dither matrix in which numerically successive threshold values are spatially separated from one another.

7. The invention of claim 6 wherein said processing step is characterized by the step of modifying the mean of the threshold values of said dither matrix.

8. The invention of claim 6 wherein said processing step is characterized by the step of modifying the deviation of the threshold values of said dither matrix.

9. The invention of claim 6 wherein said dither matrix comprises $n^2$ dither thresholds, $n$ being an integer power of 2, and wherein in said assigning step numerically successive dither threshold values of said dither matrix are arranged substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

10. In a display system including a matrix of selectively energizable bi-level display cells, a method of displaying a plurality of picture elements each corresponding to a respective one of said display cells and each having an intensity which is quantized within a predetermined quantization range, said method comprising the steps of selecting a plurality of dither threshold values, assigning each of said dither threshold values to a different one of the cells of at least a first submatrix of said cells, comparing the dither threshold value assigned to each of said cells of said submatrix to the intensity of a different one of said picture elements, and energizing a cell of said submatrix if the intensity of the corresponding picture element bears a predetermined relationship to the dither threshold value assigned to that cell, said selecting step characterized in that the mean of the selected dither threshold values is substantially different from the midpoint of said quantization range.

11. The invention of claim 10 wherein said assigning step comprises the step of assigning numerically successive ones of said threshold values to spatially separated cells of said submatrix.

12. In a display system including a matrix of selectively energizable bi-level display cells, a method of displaying a plurality of picture elements each corresponding to a respective one of said display cells and each having an intensity which is quantized within a predetermined quantization range, said method comprising the steps of selecting a plurality of dither threshold values, assigning each of said dither threshold values to a different one of the cells of at least a first submatrix of said cells, comparing the dither threshold value assigned to each of said cells of said submatrix to the intensity of a different one of said picture elements, and energizing a cell of said submatrix if the intensity of the corresponding picture element bears a predetermined relationship to the dither threshold value assigned to that cell, said selecting step characterized in that the average difference between numerically successive ones of the selected threshold values is substantially different from the quotient of the width of said quantization range and the number of cells in said submatrix.

13. The invention of claim 12 wherein said assigning step comprises the step of assigning numerically successive ones of said threshold values to spatially separated cells of said submatrix.

14. A system for displaying a continuous-tone image on a panel of selectively energizable bi-level display cells, said system comprising means for assigning a respective threshold to each of said cells and means for selecting ones of said cells for energization in response to comparisons between the intensities of elements of said image and respective ones of said thresholds, said assigning means including means for establishing a value for each said threshold such that energization of said ones of said cells substantially maps the intensities of regions of said continuous-tone image into correspondingly bright regions of said panel, the improvement comprising means for varying the characteristics of the displayed image including means for processing selected ones of said thresholds in accordance with a predetermined criterion such that all processed thresholds which have equal values prior to being processed have equal values after being processed.

15. The invention of claim 14 wherein said establishing means comprises means for assigning each threshold value of a predetermined dither matrix to selected cells of said panel.

16. The invention of claim 14 wherein said processing means comprises means for varying the mean of said threshold values.

17. The invention of claim 14 wherein said processing means comprises means for varying the deviation of said threshold values.

18. In a display system for representing a continuous-tone image on a panel of selectively energizable display cells, said image comprising a matrix of picture elements each having a predetermined intensity and each corresponding to a respective one of said display cells, the combination of means for assigning to said display cells respective thresholds, and means for energizing a cell of said panel if the intensity of the corresponding picture element bears a predetermined relationship to the value of the threshold assigned to that cell, said threshold asigning means comprising means for establishing values for said thresholds such that said energizing means substantially maps the intensities of regions of said continuous-tone image into correspondingly bright regions of said panel, characterized by means for processing at least selected ones of said thresholds to modify the values thereof in such a way that all processed thresholds which have equal values prior to being processed have equal values after being processed.

19. The invention of claim 18 wherein said cells are arranged in a plurality of cell submatrices and wherein said establishing means comprises means for assigning to each cell of each of said submatrices a spatially corresponding threshold value from a predetermined dither matrix in which numerically successive threshold values are spatially separated from one another.

20. The invention of claim 19 wherein said processing means is characterized by means for modifying the mean of the threshold values of said dither matrix.

21. The invention of claim 19 wherein said processing means is characterized by means for modifying the deviation of the threshold values of said dither matrix.

22. The invention of claim 19 wherein said dither matrix comprises $n^2$ dither thresholds, $n$ being an integer power of 2, and wherein said assigning means includes means for arranging numerically successive dither threshold values of said dither matrix substantially in accordance with the order defined by a dither operator $\hat{D}_n$, said dither operator $\hat{D}_n$ comprising the matrices $[4\hat{D}_{n/2}]$, $[4\hat{D}_{n/2} + \hat{U}_{n/2}]$, $[4\hat{D}_{n/2} + 2\hat{U}_{n/2}]$ and $[4\hat{D}_{n/2} + 3\hat{U}_{n/2}]$ in two-by-two arrangement, $\hat{D}_2$ being a two-by-two matrix comprising the numbers 0, 1, 2 and 3 and $\hat{U}_2$ being a two-by-two matrix each element of which is 1.

23. In a display system including a matrix of selectively energizable bi-level display cells, circuitry for displaying a plurality of picture elements each corresponding to a respective one of said display cells and each having an intensity which is quantized within a predetermined quantization range, said displaying circuitry comprising means for selecting a plurality of dither threshold values, means for assigning each of said dither threshold values to a different one of the cells of at least a first submatrix of said cells, means for comparing the dither threshold value assigned to each of said cells of said submatrix to the intensity of a different one of said picture elements, and means for energizing a cell of said submatrix if the intensity of the corresponding picture element bears a predetermined relationship to the dither threshold value assigned to that cell, said selecting means characterized by means for selecting said dither threshold values such that their mean is substantially different from the midpoint of said quantization range.

24. THe invention of claim 23 wherein said assigning means comprises means for assigning numerically successive ones of said threshold values to spatially separated cells of said submatrix.

25. In a display system including a matrix of selectively energizable bi-level display cells, circuitry for displaying a plurality of picture elements each corresponding to a respective one of said display cells and each having an intensity which is quantized within a predetermined quantization range, said displaying circuitry comprising means for selecting a plurality of dither threshold values, means for assigning each of said dither threshold values to a different one of the cells of at least a first submatrix of said cells, means for comparing the dither threshold value assigned to each of said cells of said submatrix to the intensity of a different one of said picture elements, and means for energizing a cell of said submatrix if the intensity of the corresponding picture element bears a predetermined relationship to the dither threshold value assigned to that cell, said selecting means characterized by means for selecting said dither threshold values such that the average difference between numerically successive ones of said selected threshold values is substantially different from the quotient of the width of said quantization range and the number of cells in said submatrix.

26. The invention of claim 25 wherein said assigning means comprises means for assigning numerically successive ones of said threshold values to spatially separated cells of said submatrix.

* * * * *